US008879037B2

(12) United States Patent
Hirosawa

(10) Patent No.: US 8,879,037 B2
(45) Date of Patent: Nov. 4, 2014

(54) LIQUID CRYSTAL DISPLAY DEVICE

(71) Applicant: Jin Hirosawa, Saitama (JP)

(72) Inventor: Jin Hirosawa, Saitama (JP)

(73) Assignee: Japan Display Inc., Tokyo (JP)

( * ) Notice: Subject to any disclaimer, the term of this patent is extended or adjusted under 35 U.S.C. 154(b) by 93 days.

(21) Appl. No.: 13/738,417

(22) Filed: Jan. 10, 2013

(65) Prior Publication Data

US 2013/0128176 A1 May 23, 2013

Related U.S. Application Data

(62) Division of application No. 13/369,057, filed on Feb. 8, 2012, now Pat. No. 8,421,976.

(30) Foreign Application Priority Data

Jul. 28, 2011 (JP) .................................. 2011-165257

(51) Int. Cl.
*G02F 1/1343* (2006.01)
*G02F 1/139* (2006.01)

(52) U.S. Cl.
CPC .... *G02F 1/134336* (2013.01); *G02F 2201/123* (2013.01); *G02F 2001/134345* (2013.01); *G02F 1/1393* (2013.01); *G02F 1/134363* (2013.01)
USPC .............. 349/141; 349/39; 349/143; 349/146

(58) Field of Classification Search
CPC .............. G02F 1/13463; G02F 1/1393; G02F 1/134336; G02F 2201/123; G02F 2001/134345

USPC .............. 349/38, 39, 42, 111, 139, 141, 143, 349/146; 345/87, 92
See application file for complete search history.

(56) References Cited

U.S. PATENT DOCUMENTS 6,266,116 B1    7/2001    Ohta et al.
6,862,067 B2    3/2005    Matsumoto et al.
(Continued)

FOREIGN PATENT DOCUMENTS

JP    06-222397    8/1994
JP    07-159807    6/1995
(Continued)

OTHER PUBLICATIONS

Computer-generated English translation of JP 9-105908, pp. 14-50, Apr. 1997.*

(Continued)

*Primary Examiner* — Dung Nguyen
*Assistant Examiner* — Tai Duong
(74) *Attorney, Agent, or Firm* — Oblon, Spivak, McClelland, Maier & Neustadt, L.L.P.

(57) ABSTRACT

According to one embodiment, a liquid crystal display device includes a main pixel electrode having a first width in a first direction and a first edge extending in a second direction, and a sub-pixel electrode. The sub-pixel electrode has a second width, which is greater than the first width in the first direction, has a third width, which is a maximum width in the first direction at a central portion of the sub-pixel electrode, has a fourth width in the second direction at a position with a first distance from the first edge in the first direction, and has a fifth width, which is less than the fourth width at a position with a second distance, which is greater than the first distance, from the first edge in the first direction.

18 Claims, 13 Drawing Sheets

(56) References Cited

U.S. PATENT DOCUMENTS

| | | |
|---|---|---|
| 7,495,724 B2 | 2/2009 | Yoshida et al. |
| 7,742,135 B2 | 6/2010 | Tago et al. |
| 2001/0010575 A1 | 8/2001 | Yoshida et al. |
| 2002/0057412 A1 | 5/2002 | Ashizawa et al. |
| 2004/0165136 A1 | 8/2004 | Sugiyama et al. |
| 2005/0128410 A1 | 6/2005 | Lee |
| 2005/0206824 A1 | 9/2005 | Son et al. |
| 2005/0219453 A1 | 10/2005 | Kubo et al. |
| 2006/0001812 A1* | 1/2006 | Lee et al. ............... 349/141 |
| 2007/0115234 A1 | 5/2007 | Kim et al. |
| 2007/0200990 A1 | 8/2007 | Hirosawa et al. |
| 2007/0216841 A1* | 9/2007 | Konno ............... 349/141 |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |
| 2008/0192160 A1 | 8/2008 | Yoshida et al. |
| 2009/0147201 A1 | 6/2009 | Yoshida et al. |
| 2009/0207363 A1 | 8/2009 | Hirosawa |
| 2010/0020257 A1 | 1/2010 | Jun et al. |
| 2011/0075083 A1 | 3/2011 | Takeda et al. |
| 2011/0234947 A1 | 9/2011 | Hirosawa |
| 2012/0019755 A1 | 1/2012 | Tokuoka et al. |
| 2012/0099070 A1 | 4/2012 | Hirosawa et al. |
| 2012/0182501 A1 | 7/2012 | Fukuoka et al. |
| 2012/0182509 A1 | 7/2012 | Takano et al. |
| 2012/0236239 A1 | 9/2012 | Morita et al. |
| 2012/0249941 A1 | 10/2012 | Yamamoto et al. |
| 2012/0268703 A1 | 10/2012 | Funakoshi et al. |
| 2012/0293752 A1 | 11/2012 | Takeda et al. |
| 2013/0003005 A1 | 1/2013 | Yoshida et al. |
| 2013/0033663 A1 | 2/2013 | Tago et al. |

FOREIGN PATENT DOCUMENTS

| | | |
|---|---|---|
| JP | 7-191336 | 7/1995 |
| JP | 9-105908 | 4/1997 |
| JP | 09-160041 | 6/1997 |
| JP | 09-160042 | 6/1997 |
| JP | 09-160061 | 6/1997 |
| JP | 10-026765 | 1/1998 |
| JP | 10-090708 | 4/1998 |
| JP | 10-186329 | 7/1998 |
| JP | 10-186366 | 7/1998 |
| JP | 11-2836 | 1/1999 |
| JP | 11-194353 | 7/1999 |
| JP | 11-295764 | 10/1999 |
| JP | 2000-29028 | 1/2000 |
| JP | 2000-98405 | 4/2000 |
| JP | 2002-296607 | 10/2002 |
| JP | 2004-109794 | 4/2004 |
| JP | 2005-003802 | 1/2005 |
| JP | 3644653 | 5/2005 |
| JP | 2005-242296 | 9/2005 |
| JP | 2005-242307 | 9/2005 |
| JP | 2007-248557 | 9/2007 |
| JP | 2008-26756 | 2/2008 |
| JP | 2009-69332 | 4/2009 |
| JP | 2009-192822 | 8/2009 |
| KR | 10-2005-0034953 | 4/2005 |
| WO | WO 99/45430 | 9/1999 |

OTHER PUBLICATIONS

Office Action issued May 7, 2013 in Japanese Application No. 2011-165257 (With English Translation).

* cited by examiner

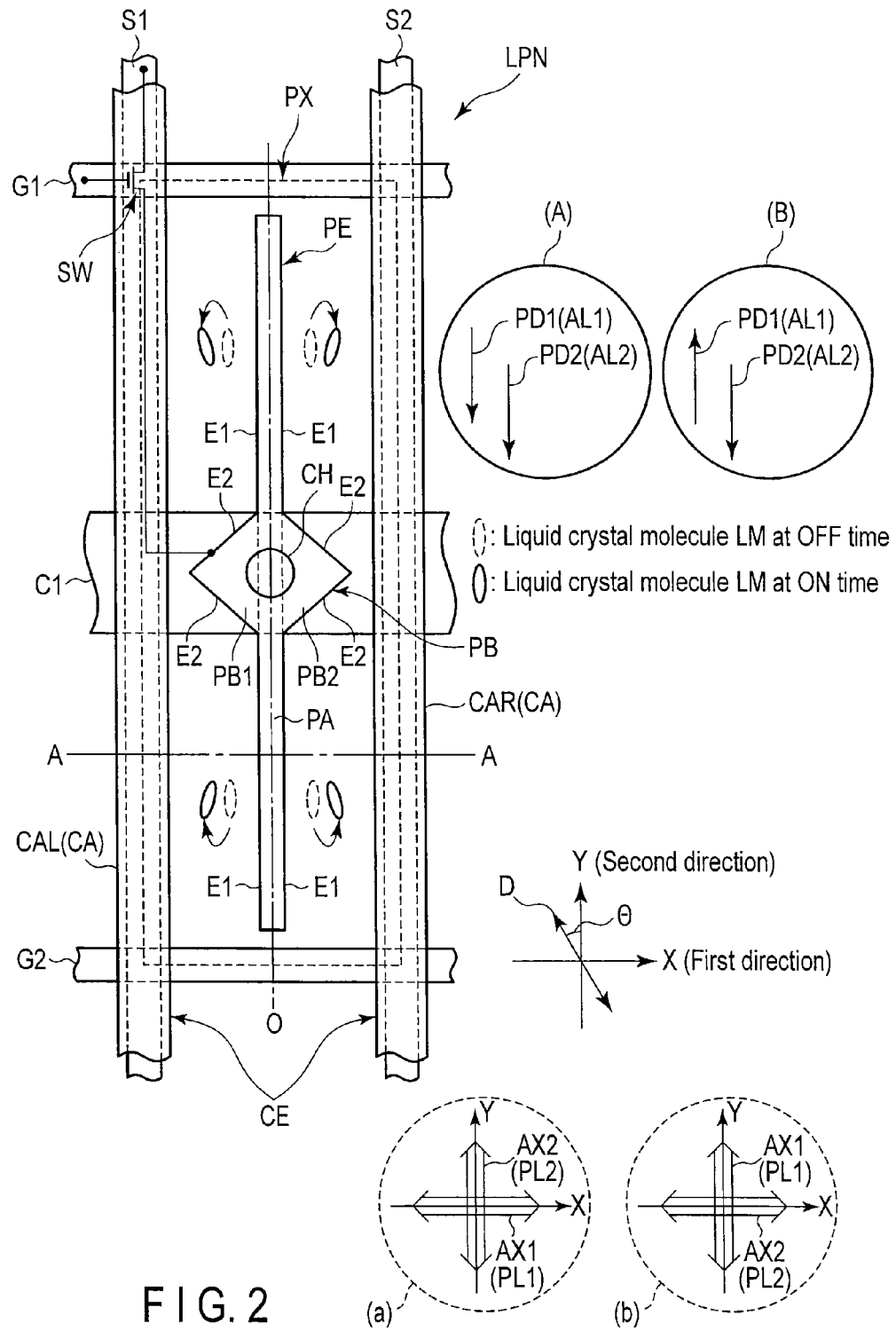
F I G. 2

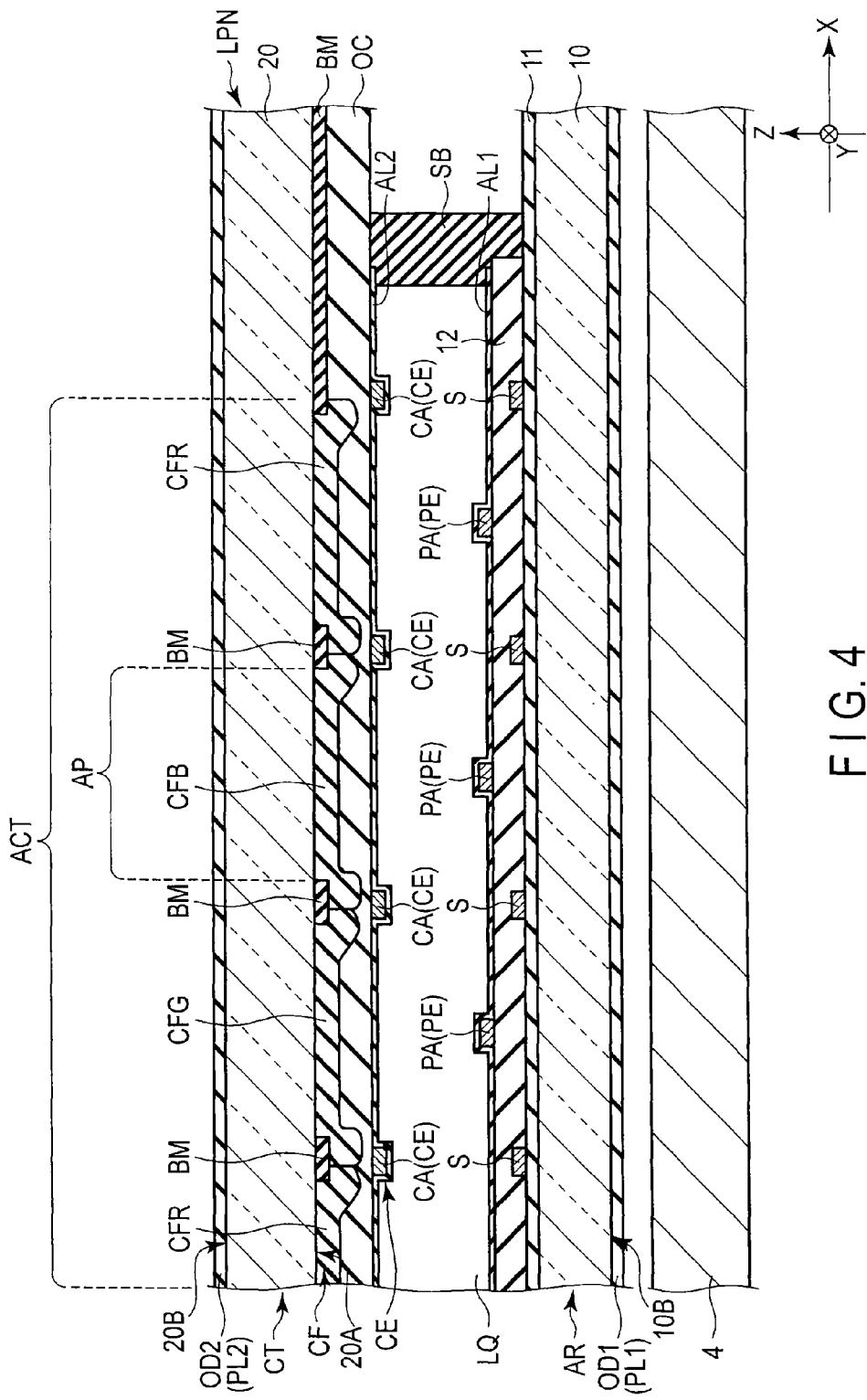
F I G. 4

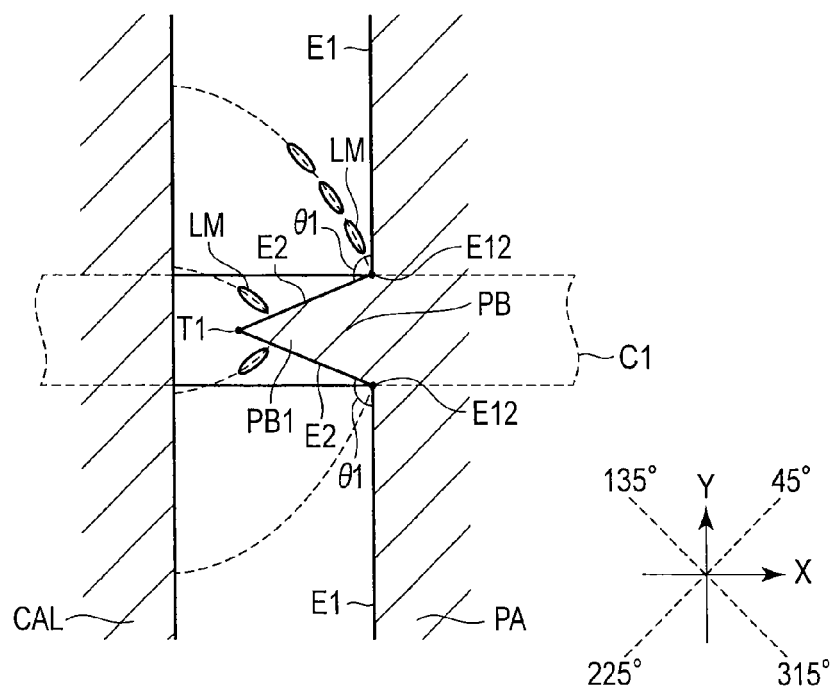
F I G. 6
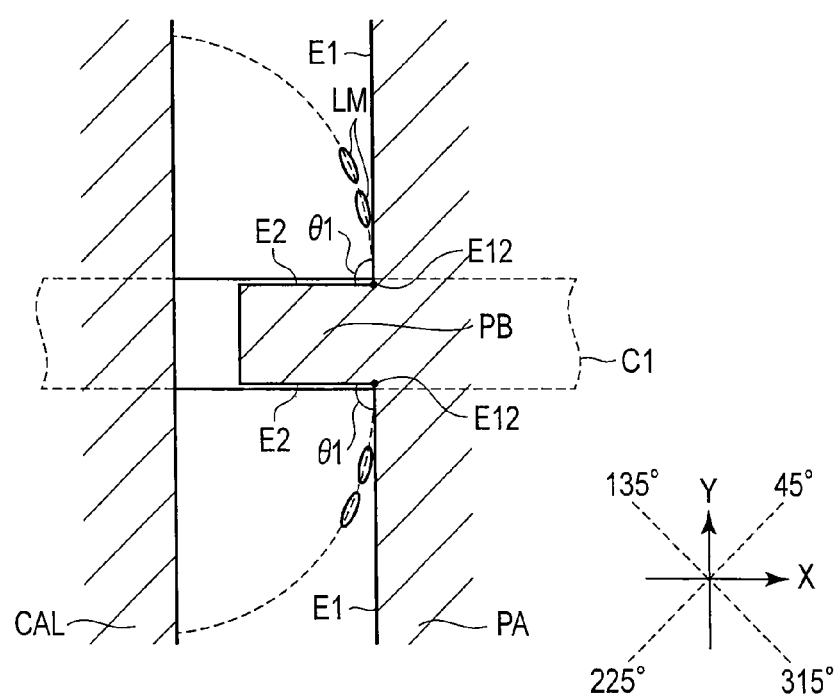
F I G. 7

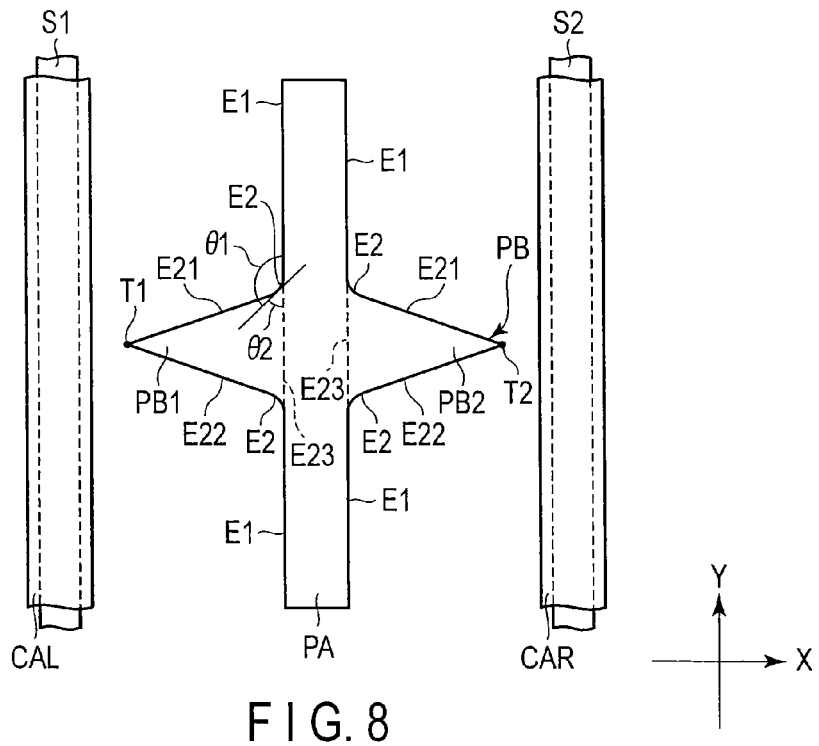
F I G. 8
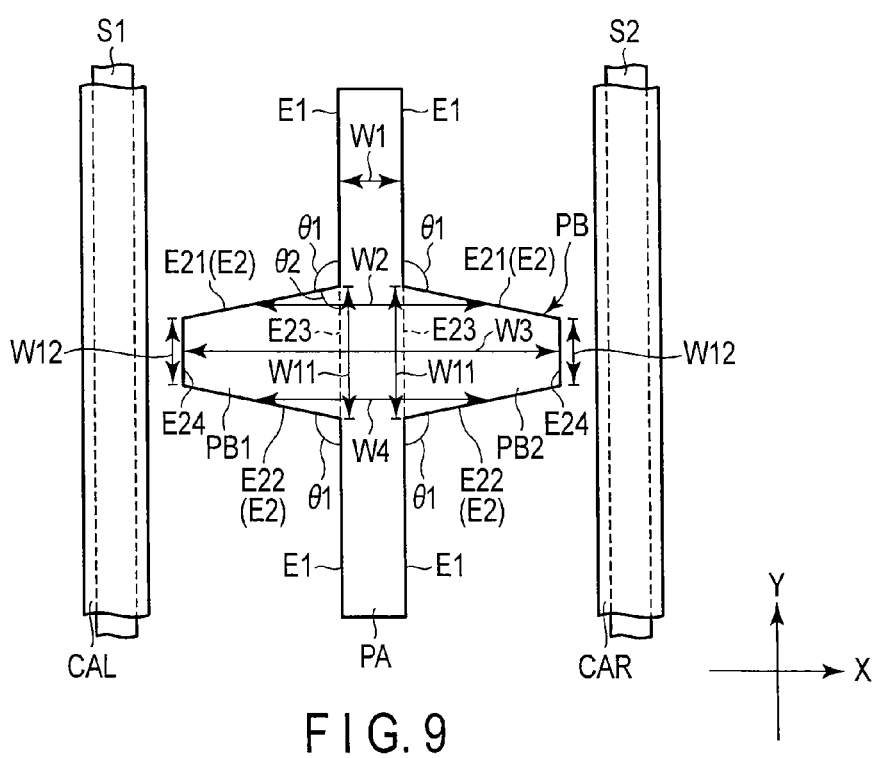
F I G. 9

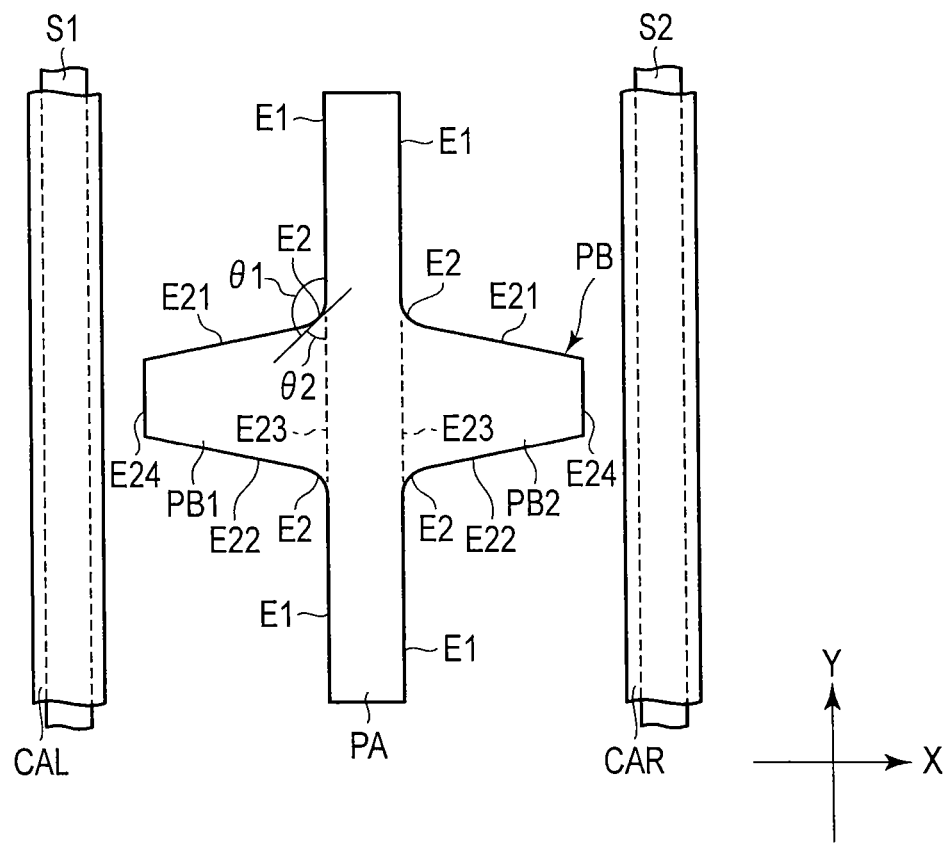
F I G. 10

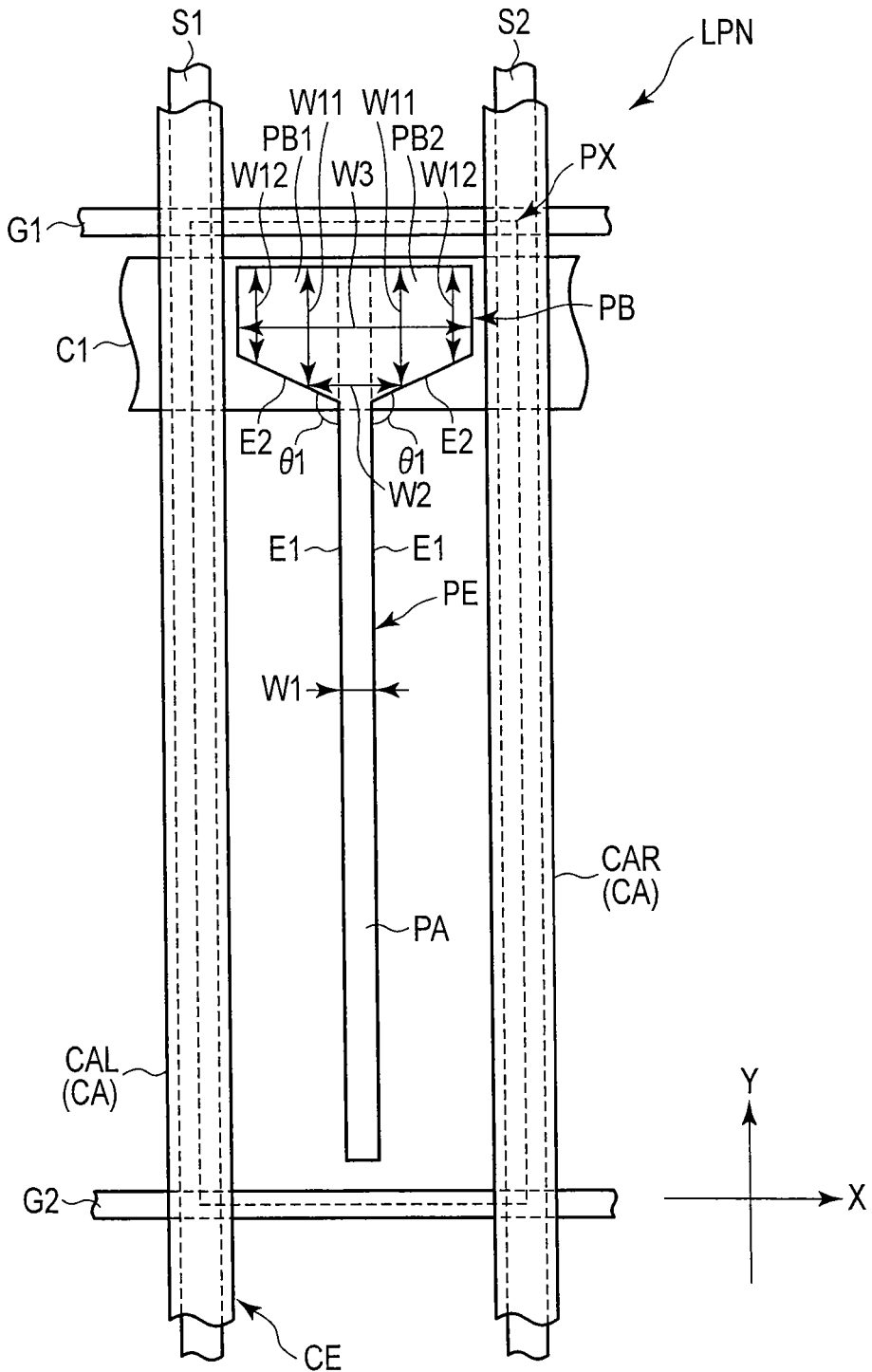
F I G. 16

LIQUID CRYSTAL DISPLAY DEVICE

CROSS-REFERENCE TO RELATED APPLICATION

This application is a divisional of U.S. application Ser. No. 13/369,057 filed Feb. 8, 2012, and is based upon and claims the benefit of priority from Japanese Patent Application No. 2011-165257, filed Jul. 28, 2011; the entire contents of each of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of a pixel at a time when a liquid crystal display panel shown in FIG. 1 is viewed from a counter-substrate side.

FIG. 4 is a schematic cross-sectional view, taken along line A-A in FIG. 2, showing a cross-sectional structure of the liquid crystal display panel shown in FIG. 2.

FIG. 6 is a view for explaining a relationship between an electric field, which is produced between a pixel electrode and a common electrode in the liquid crystal display panel according to the embodiment, and a transmittance.

FIG. 7 is a view for explaining a relationship between an electric field, which is produced between a pixel electrode and a common electrode in a liquid crystal display panel according to a comparative example, and a transmittance.

FIG. 8 is a plan view which schematically shows another structure example of the pixel at a time when the liquid crystal display panel shown in FIG. 1 is viewed from the counter-substrate side.

FIG. 9 is a plan view which schematically shows another structure example of the pixel at a time when the liquid crystal display panel shown in FIG. 1 is viewed from the counter-substrate side.

FIG. 10 is a plan view which schematically shows another structure example of the pixel at a time when the liquid crystal display panel shown in FIG. 1 is viewed from the counter-substrate side.

FIG. 16 is a plan view which schematically shows another structure example at a time when the array substrate is viewed from the counter-substrate side.

DETAILED DESCRIPTION

Figure 1:
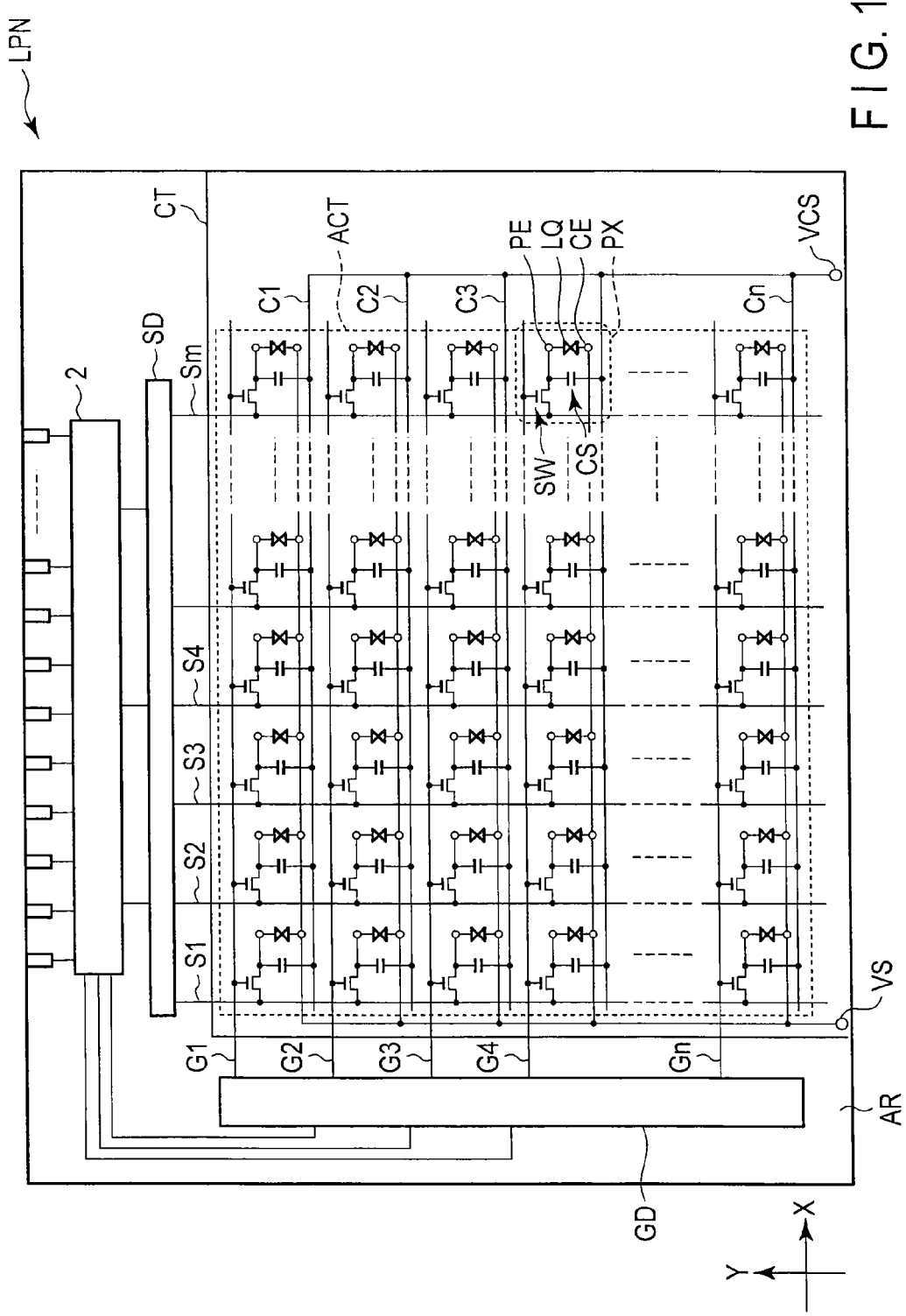
FIG. 1 is a view which schematically illustrates a structure and an equivalent circuit of a liquid crystal display panel according to an embodiment.

In general, according to one embodiment, a liquid crystal display device includes a first substrate including a strip-shaped main pixel electrode having a first width in a first direction and linearly extending in a second direction crossing the first direction, the main pixel electrode including a first edge extending in the second direction, the first substrate further including a sub-pixel electrode crossing the main pixel electrode and protruding from the first edge in the first direction, and a first alignment film covering the main pixel electrode and the sub-pixel electrode; a second substrate including main common electrodes extending substantially parallel to the main pixel electrode on both sides of the main pixel electrode, and a second alignment film covering the main common electrodes; and a liquid crystal layer including liquid crystal molecules held between the first substrate and the second substrate, wherein the sub-pixel electrode has a second width, which is greater than the first width, in the first direction, has a third width, which is a maximum width in the first direction, at a central portion of the sub-pixel electrode, has a fourth width in the second direction at a position with a first distance from the first edge in the first direction, and has a fifth width, which is less than the fourth width, at a position with a second distance, which is greater than the first distance, from the first edge in the first direction.

According to another embodiment, a liquid crystal display device includes a first substrate including a first wiring line and a second wiring line which neighbor with a distance in a first direction and extend in a second direction crossing the first direction, a strip-shaped main pixel electrode which is disposed between the first wiring line and the second wiring line, has a first width in the first direction and linearly extends in the second direction, and a sub-pixel electrode which crosses an intermediate portion in the second direction of the main pixel electrode and includes projection portions protruding toward the first wiring line and the second wiring line; a second substrate including main common electrodes which are opposed to the first wiring line and the second wiring line and extend substantially parallel to the main pixel electrode; and a liquid crystal layer including liquid crystal molecules held between the first substrate and the second substrate, wherein the sub-pixel electrode has a second width, which is greater than the first width, in the first direction, has a third width, which is a maximum width in the first direction, at a central portion of the sub-pixel electrode, has a fourth width in the second direction on the main pixel electrode side, and has a fifth width, which is less than the fourth width, in the second direction on the first wiring line side and on the second wiring line side.

According to another embodiment, a liquid crystal display device includes a first substrate including a first wiring line and a second wiring line which neighbor with a distance in a first direction and extend in a second direction crossing the first direction, a strip-shaped main pixel electrode which is disposed between the first wiring line and the second wiring line and includes a first edge linearly extending in the second direction, and a sub-pixel electrode which includes a second edge extending in a direction different from the direction of extension of the first edge, the second edge being continuous with the first edge; a second substrate including main common electrodes which are opposed to the first wiring line and the second wiring line and extend substantially parallel to the main pixel electrode; and a liquid crystal layer including liquid crystal molecules held between the first substrate and the second substrate, wherein an exterior angle between the first edge and the second edge is an obtuse angle.

According to another embodiment, a liquid crystal display device includes a first substrate including a first wiring line and a second wiring line which neighbor with a distance in a first direction and extend in a second direction crossing the first direction, a strip-shaped main pixel electrode which is disposed between the first wiring line and the second wiring line, has a first width in the first direction and linearly extends in the second direction, and a sub-pixel electrode which crosses one end portion in the second direction of the main pixel electrode and includes projection portions protruding toward the first wiring line and the second wiring line; a second substrate including main common electrodes which are opposed to the first wiring line and the second wiring line and extend substantially parallel to the main pixel electrode; and a liquid crystal layer including liquid crystal molecules held between the first substrate and the second substrate, wherein the sub-pixel electrode has a second width, which is greater than the first width, in the first direction, has a third width, which is a maximum width in the first direction, at a central portion of the sub-pixel electrode, has a fourth width in the second direction on the main pixel electrode side, and has a fifth width, which is less than the fourth width, in the second direction on the first wiring line side and on the second wiring line side.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The lines S extend substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ.

The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

A gate line G1, a gate line G2 and a storage capacitance line C1 extend in the first direction X. A source line S1 and a source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The pixel electrode PE is disposed between the source line S1 and source line S2 which neighbor each other. In addition, the pixel electrode PE is located between the gate line G1 and gate line G2.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX.

The switching element SW in the illustrated example is electrically connected to the gate line G1 and source line S1. The switching element SW is provided at an intersection between the gate line G1 and source line S1. A drain line of the switching element SW is formed to extend along the source line S1 and storage capacitance line C1, and is electrically connected to the pixel electrode PE via a contact hole CH which is formed at an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA is located between the source line S1 and source line S2. In the illustrated example, the sub-pixel electrode PB crosses an intermediate portion in the second direction Y of the main pixel electrode PA. Accordingly, the main pixel electrode PA linearly extends in the second direction Y from the intersection with the sub-pixel electrode PB to the vicinity of the upper side end portion of the pixel PX and to the vicinity of the lower side end portion of the pixel PX. Specifically, the pixel electrode PE is formed in a cross shape. In addition, the main pixel electrode PA is disposed at a substantially middle position between the source line S1 and source line S2, that is, at a center of the pixel PX. The distance in the first direction X between the source line S1 and the main pixel electrode PA is substantially equal to the distance in the first direction X between the source line S2 and the main pixel electrode PA. The main pixel electrode PA is formed in a strip shape having a substantially equal width W1 in the first direction X. In addition, the main pixel electrode PA has first edges E1 which linearly extend in the second direction Y. The first edges E1 are located, with an interval of the width W1, on the source line S1 side of the main pixel electrode PA and on the source line S2 side of the main pixel electrode PA, respectively.

The sub-pixel electrode PB crosses the main pixel electrode PA and extends along the first direction X. Alternatively, the sub-pixel electrode PB protrudes from the first edges E1 of the main pixel electrode PA in the first direction X. The sub-pixel electrode PB includes projection portions which protrude from the intersection with the main pixel electrode PA toward the source line S1 and source line S2. Specifically, that region of the sub-pixel electrode PB, which protrudes from the main pixel electrode PA toward the source line S1, corresponds to a projection portion PB1, and that region of the sub-pixel electrode PB, which protrudes from the main pixel electrode PA toward the source line S2, corresponds to a projection portion PB2. The projection portion PB1 and projection portion PB2 are located on both sides of the main pixel electrode PA, have the same shape, and are line-symmetric with respect to a center line O of the main pixel electrode PA, which extends in the second direction Y. The sub-pixel electrode PB includes second edges E2 which are continuous with the first edges E1. The second edges E2 extend in directions different from the direction of the first edges E1, that is, in directions different from the second direction Y. The shape of the sub-pixel electrode PB will be described later in detail.

In the example illustrated, the sub-pixel electrode PB is opposed to the storage capacitance line C1. Specifically, the projection portion PB1 and projection portion PB2 of the sub-pixel electrode PB, as a whole, are located in an area overlapping the storage capacitance line C1. The sub-pixel electrode PB is electrically connected to the switching element SW via the contact hole CH.

The common electrode CE includes main common electrodes CA. The main common electrodes CA extend, in the X-Y plane, linearly in the second direction Y that is substantially parallel to the main pixel electrode PA, on both sides of the main pixel electrode PA. Alternatively, the main common electrodes CA are opposed to the source lines S which extend in the second direction Y, and extend substantially in parallel to the main pixel electrode PA. The main common electrode CA is formed in a strip shape having a substantially equal width W1 in the first direction X.

In the example illustrated, two main common electrodes CA are arranged in parallel with a distance in the first direction. Specifically, the main common electrodes CA include a main common electrode CAL disposed at the left side end portion of the pixel PX, and a main common electrode CAR disposed at the right side end portion of the pixel PX. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is opposed to the source line S1, and the main common electrode CAR is opposed to the source line S2. The main common electrode CAL and the main common electrode CAR are electrically connected to each other within the active area or outside the active area.

Paying attention to the positional relationship between the pixel electrode PE and the main common electrodes CA, the pixel electrode PE and the main common electrodes CA are alternately arranged along the first direction X. The main pixel electrode PA and the main common electrodes CA are disposed in parallel to each other. In this case, in the X-Y plane, each of the main common electrodes CA does not overlap the pixel electrode PE.

One pixel electrode PE is located between the main common electrode CAL and main common electrode CAR which neighbor each other. In other words, the main common electrode CAL and main common electrode CAR are disposed on both sides of a position immediately above the pixel electrode PE. Alternatively, the pixel electrode PE is disposed between the main common electrode CAL and main common electrode CAR. Thus, the main common electrode CAL, main pixel electrode PA and main common electrode CAR are arranged in the named order along the first direction X.

The main pixel electrode PA is located at a substantially middle point between the main common electrode CAL and main common electrode CAR. Specifically, the distance between the main common electrode CAL and the main pixel electrode PA in the first direction X is substantially equal to the distance between the main common electrode CAR and the main pixel electrode PA in the first direction X.

Figure 3:
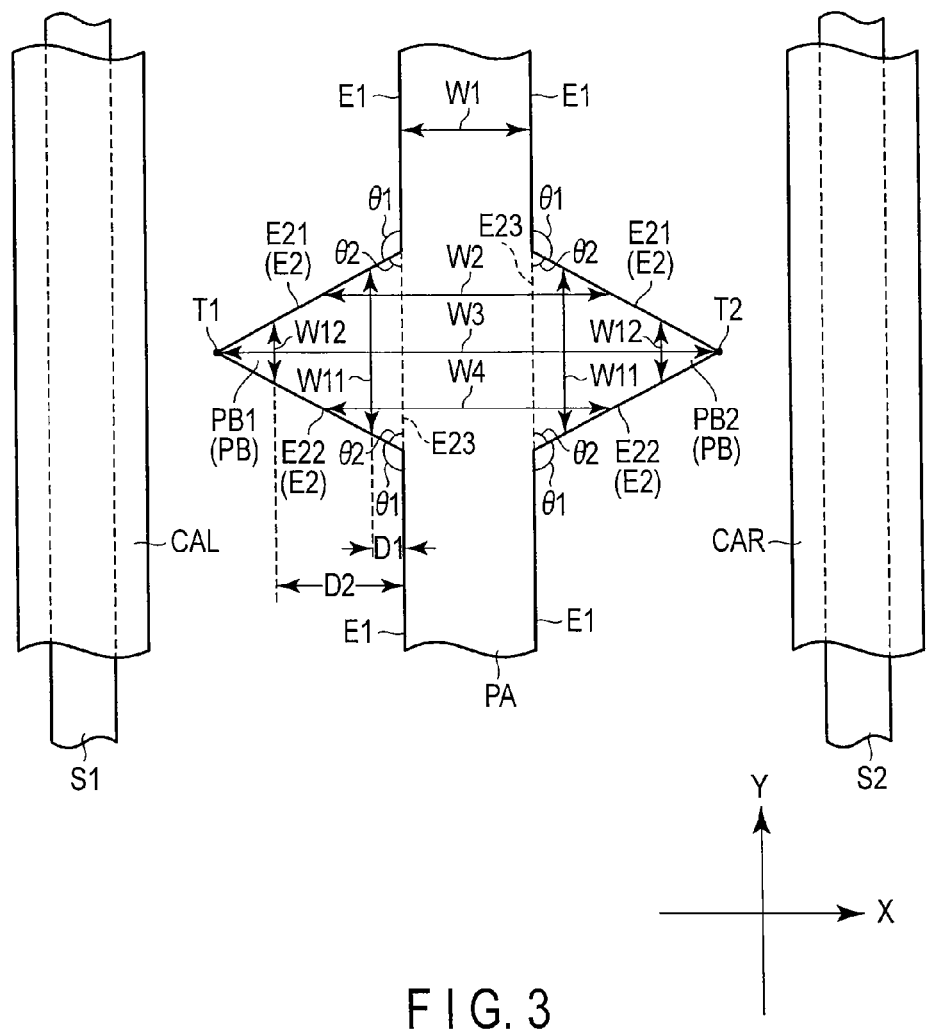
FIG. 3 is a plan view in an X-Y plane, in which a sub-pixel electrode shown in FIG. 2 and a peripheral region thereof are enlarged.

FIG. 3 is a plan view in the X-Y plane, in which the sub-pixel electrode PB shown in FIG. 2 and a peripheral region thereof are enlarged. FIG. 3 shows only parts which are necessary for the description.

In the example illustrated, the projection portion PB1 of the sub-pixel electrode PB, which is disposed between the main pixel electrode PA and the source line S1, and the projection portion PB2 of the sub-pixel electrode PB, which is disposed between the main pixel electrode PA and the source line S2, have triangular shapes, respectively, and, to be more specific, have isosceles-triangular shapes. Specifically, each of the projection portion PB1 and projection portion PB2 includes an oblique line E21 and an oblique line E22 which are inclined to the first direction X, and a base E23 which is located on the same straight line as the first edge E1. When the length of the base E23 is equal to each of the oblique line E21 and oblique line E22, each of the projection portion PB1 and projection portion PB2 has an equilateral-triangular shape. The oblique line E21 and oblique line E22 correspond to a pair of second edges E2 each having a linear shape. The length of the oblique line E21 is equal to the length of the oblique line E22. The oblique line E21 is not parallel to the oblique line E22. An intersection between the oblique line E21 and oblique line E22 in the projection portion PB1, that is, an apex T1 of the projection portion PB1, is located at a position closest to the source line S1 or main common electrode CAL. An intersection between the oblique line E21 and oblique line E22 in the projection portion PB2, that is, an apex T2 of the projection portion PB2, is located at a position closest to the source line S2 or main common electrode CAR.

Since the sub-pixel electrode PB crosses the intermediate portion of the main pixel electrode PA, an exterior angle $\theta 1$ is formed at four locations between the main pixel electrode PA and the sub-pixel electrodes PB. The exterior angle $\theta 1$ corresponds to an angle formed between the first edge E1 and the linear second edge E2. Each of the exterior angles $\theta 1$ at the four locations is an obtuse angle which is greater than 90°. The exterior angles $\theta 1$ at the four locations in the Figure are substantially equal. Thus, the sum of the exterior angles $\theta 1$ at the four locations is greater than 360°. For example, the exterior angle $\theta 1$ is 135°. In other words, an interior angle $\theta 2$ between the base E23 and the second edge E2 is an acute angle.

Paying attention to the width of the sub-pixel electrode PB in the first direction X, a width W2 in the first direction X between the oblique line E21 of the projection portion PB1 and the oblique line E21 of the projection portion PB2 is greater than the width W1 of the main pixel electrode PA. A width W3 in the first direction X between the apex T1 of the projection portion PB1 and the apex T2 of the projection portion PB2 is greater than the width W2 and is the maximum width. A width W4 in the first direction X between the oblique line E22 of the projection portion PB1 and the oblique line E22 of the projection portion PB2 is greater than the width W1 and is less than the width W3. Specifically, the sub-pixel electrode PB has the width W3, which is the maximum width in the first direction X, at the central portion of the sub-pixel electrode PB in the second direction Y, and has a width, which is greater than the width W1 and is less than the width W3, on both sides of this central portion.

Paying attention to the width in the second direction Y of the sub-pixel electrode PB, this width gradually decreases in a direction away from the main pixel electrode PA (or in a direction toward the source line or the main common electrode). Specifically, the projection portion PB1 of the sub-pixel electrode PB has a width W11 at a position (a position on the main pixel electrode PA side) with a distance D1 in the first direction X from the first edge E1 (or the base E23), and a width W12, which is less than the width W11, at a position (a position on the source line S1 side or a position on the main common electrode CAL side) with a distance D2, which is greater than the distance D1, in the first direction X from the first edge E1. Similarly, the projection portion PB2 of the sub-pixel electrode PB has the width W11 at a position on the main pixel electrode PA side, and has the width W12, which is less than the width W11, at a position on the source line S2 side or a position on the main common electrode CAR side).

FIG. 4 is a schematic cross-sectional view, taken along line A-A in FIG. 2, showing a cross-sectional structure of the liquid crystal display panel LPN shown in FIG. 2. FIG. 4 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. Source lines S are formed on a first interlayer insulation film 11, and are covered with a second interlayer insulation film 12. Gate lines and storage capacitance lines, which are not shown, are disposed, for example, between the first insulative substrate 10 and the first interlayer insulation film 11. Pixel electrodes PE are formed on the second interlayer insulation film 12. Each pixel electrode PE is located on the inside of a position immediately above each of neighboring source lines S. A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed over the second interlayer insulation film 12. The first alignment film AL1 is formed of a material which exhibits horizontal alignment properties. In the meantime, the array substrate AR may include a part of the common electrode CE.

The counter-substrate CT is formed by using a second insulative substrate 20 having light transmissivity. The counter-substrate CT includes a black matrix BM, a color filter CF, an overcoat layer OC, a common electrode CE, and a second alignment film AL2.

The black matrix BM partitions the pixels PX and forms aperture portions AP which are opposed to the pixel electrodes PE. Specifically, the black matrix BM is disposed so as to be opposed to wiring portions, such as the source lines S, gate lines, storage capacitance lines, and switching elements. In this example, only those portions of the black matrix BM, which extend in the second direction Y, are depicted, but the black matrix BM may include portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CFR, which is formed of a resin material that is colored in red, is disposed in association with a red pixel. A blue color filter CFB, which is formed of a resin material that is colored in blue, is disposed in association with a blue pixel. A green color filter CFG, which is formed of a resin material that is colored in green, is disposed in association with a green pixel. Boundaries between these color filters CF are located at positions overlapping the black matrix BM. The overcoat layer OC covers the color filters CF. The overcoat layer OC reduces the effect of asperities on the surface of the color filters CF. The overcoat layer OC is formed of, for example, a transparent resin material.

The common electrode CE is formed on that side of the overcoat layer OC, which is opposed to the array substrate AR. The main common electrodes CA are located above the source line S. The second alignment film AL2 is disposed on that surface of the counter-substrate CT, which is opposed to the array substrate AR, and the second alignment film AL2 extends over substantially the entirety of the active area ACT. The second alignment film AL2 covers the common electrodes CE and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 2, the first alignment treatment direction PD1 and second alignment treatment direction PD2 are parallel to each other and are identical. In an example shown in part (B) of FIG. 2, the first alignment treatment direction PD1 and second alignment treatment direction PD2 are parallel to each other and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 µm, is created. The array substrate AR and counter-substrate CT are attached by a sealant SB on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached, by, e.g. an adhesive, to an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached, by, e.g. an adhesive, to an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to an initial alignment direction of liquid crystal molecules LM, that is, the first alignment treatment direction PD1 or second alignment treatment direction PD2. When the initial alignment direction is parallel to the second direction Y, the polarization axis of one polarizer is parallel to the second direction Y or is parallel to the first direction X.

In an example shown in part (a) of FIG. 2, the first polarizer PL1 is disposed such that the first polarization axis AX1 thereof is perpendicular to the second direction Y that is the initial alignment direction of liquid crystal molecules LM, and the second polarizer PL2 is disposed such that the second polarization axis AX2 thereof is parallel to the initial alignment direction of liquid crystal molecules LM. In addition, in an example shown in part (b) of FIG. 2, the second polarizer PL2 is disposed such that the second polarization axis AX2 thereof is perpendicular to the second direction Y that is the initial alignment direction of liquid crystal molecules LM, and the first polarizer PL1 is disposed such that the first polarization axis AX1 thereof is parallel to the initial alignment direction of liquid crystal molecules LM.

Next, the operation of the liquid crystal display panel LPN having the above-described structure is described with reference to FIG. 2 to FIG. 4.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 2, the liquid crystal molecule LM in a lower half part of the region between the pixel electrode PE and main common electrode CAL rotates clockwise relative to the second direction Y, and is aligned in a lower left direction in the Figure. The liquid crystal molecule LM in an upper half part of the region between the pixel electrode PE and main common electrode CAL rotates counterclockwise relative to the second direction Y, and is aligned in an upper left direction in the Figure. The liquid crystal molecule LM in a lower half part of the region between the pixel electrode PE and main common electrode CAR rotates counterclockwise relative to the second direction Y, and is aligned in a lower right direction in the Figure. The liquid crystal molecule LM in an upper half part of the region between the pixel electrode PE and main common electrode CAR rotates clockwise relative to the second direction Y, and is aligned in an upper lower right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, linearly polarized light perpendicular to the first polarization axis AX1 of the first polarizer PL1 enters the liquid crystal display panel LPN, and the polarization state of the light varies depending on the alignment state of the liquid crystal molecules LM when the light passes through the liquid crystal layer LQ. At the ON time, at least part of the light emerging from the liquid crystal layer LQ passes through the second polarizer PL2 (white display).

Figure 5:
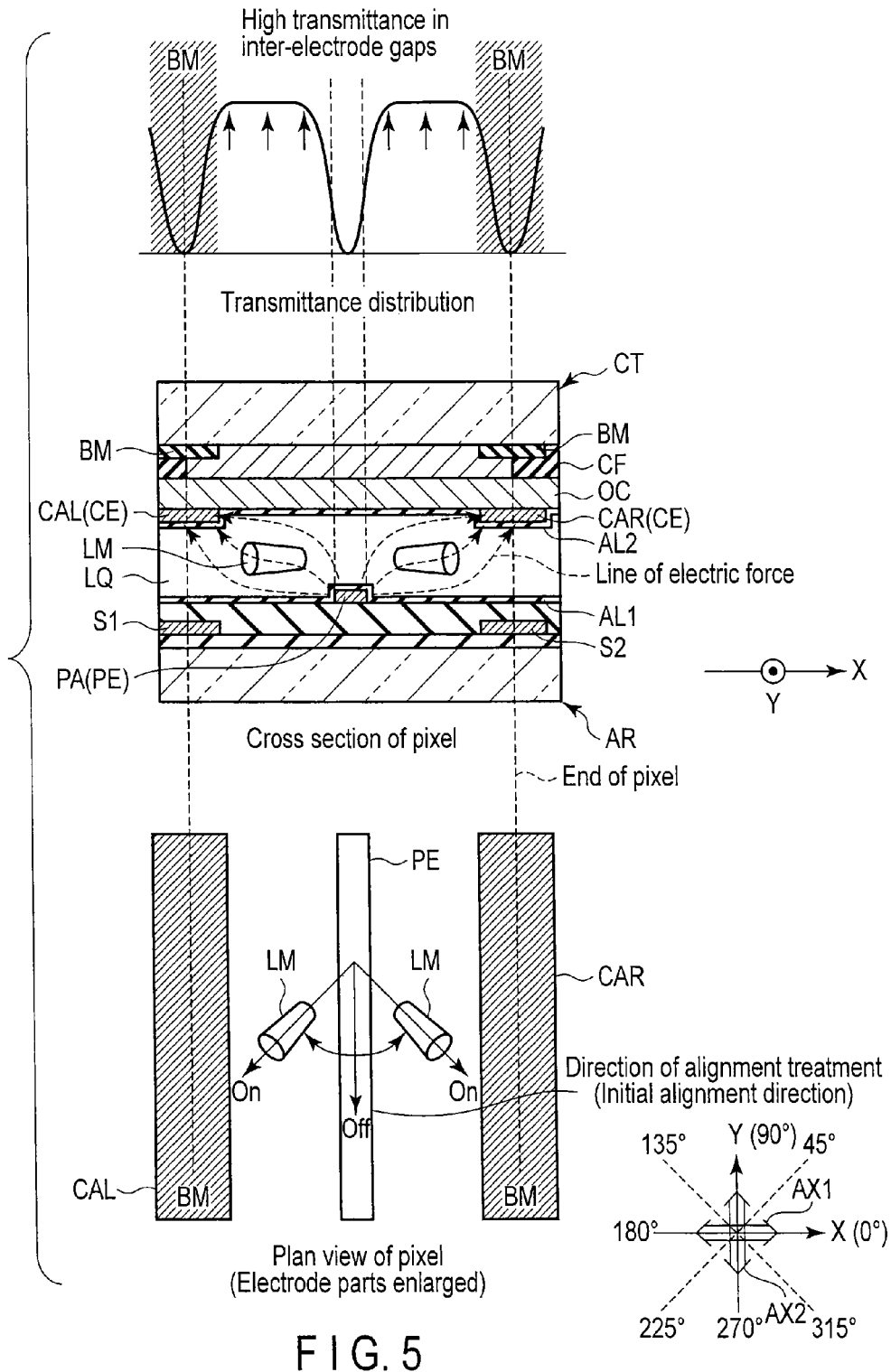
FIG. 5 is a view for explaining an electric field which is produced between a pixel electrode and a common electrode in the liquid crystal display panel shown in FIG. 2, and a relationship between directors of liquid crystal molecules by this electric field and a transmittance.

FIG. 5 is a view for explaining an electric field which is produced between the pixel electrode PE and common electrode CE in the liquid crystal display panel LPN shown in FIG. 2, and a relationship between directors of liquid crystal molecules LM by this electric field and a transmittance.

In the OFF state, the liquid crystal molecules are initially aligned in a direction which is substantially parallel to the second direction Y. In the ON state in which a potential difference is produced between the pixel electrode PE and the common electrode CE, when the director of the liquid crystal molecule LM (or the major-axis direction of the liquid crystal molecule LM) deviates by about 45° from the first polarization axis AX1 of the first polarizer PL1 and from the second polarization axis AX2 of the second polarizer PL2, the optical modulation ratio of the liquid crystal layer LQ is highest (i.e. the transmittance at the aperture portion is highest).

In the example illustrated, in the ON state, the director of the liquid crystal molecule LM between the main common electrode CAL and the pixel electrode PE is substantially parallel to a 45°-225° azimuth direction in the X-Y plane, and the director of the liquid crystal molecule LM between the main common electrode CAR and the pixel electrode PE is substantially parallel to a 135°-315° azimuth direction in the X-Y plane, and a peak transmittance is obtained. Meanwhile, when the director of the liquid crystal molecule LM is substantially parallel to a 0°-180° azimuth direction in the X-Y plane or substantially parallel to a 90°-270° azimuth direction in the X-Y plane, the transmittance at the aperture portion becomes lowest.

In the ON state, if attention is paid to the transmittance distribution per pixel, the liquid crystal molecules LM over the pixel electrode PE and common electrode CE hardly rotate from the initial alignment direction. In other words, the directors of the liquid crystal molecules LM are substantially parallel to the 90°-270° azimuth direction. Thus, the transmittance is substantially zero. On the other hand, a high transmittance can be obtained over almost the entire area of the inter-electrode gaps between the pixel electrode PE and the common electrode CE.

Each of the main common electrode CAL that is located immediately above the source line S1 and the main common electrode CAR that is located immediately above the source line S2 is opposed to the black matrix BM. Each of the main common electrode CAL and main common electrode CAR has a width which is equal to or less than the width of the black matrix BM in the first direction X, and does not extend toward the pixel electrode PE from the position overlapping the black matrix BM. Thus, the aperture portion in each pixel, which contributes to display, corresponds to regions between the pixel electrode PE and main common electrode CAL and between the pixel electrode PE and main common electrode CAR, these regions being included in the region between the black matrixes BM or the region between the source line S1 and source line S2.

In the present embodiment, the pixel electrode PE includes the sub-pixel electrode PB which has the width W11 at the position near the main pixel electrode PA, and has the width W12, which is less than the width W11, at the position away from the main pixel electrode PA. Therefore, a high transmittance can be obtained in the aperture portion. This point will be concretely described below.

FIG. 6 is a view for explaining a relationship between the electric field, which is produced between the pixel electrode PE and common electrode CE in the liquid crystal display panel LPN according to the embodiment, and a transmittance. A description is given of, by way of example, the relationship between the electric field produced between the projection portion PB1 of the sub-pixel electrode PB, which protrudes from the main pixel electrode PA, and the main common electrode CAL, and the transmittance. The example illustrated corresponds to an example in which the width of the sub-pixel electrode PB in the second direction Y gradually decreases in a direction away from the main pixel electrode PA, or an example in which the exterior angle θ1 between the first edge E1 of main pixel electrode PA and the second edge E2, which is continuous with the first edge E1, is an obtuse angle.

At the ON time, an electric field is produced between the main pixel electrode PA and sub-pixel electrode PB, on one hand, and the main common electrode CAL, on the other hand. In the region where the alignment state of liquid crystal molecules LM has changed from the initial alignment state, backlight passes and this region becomes a light part (white display). However, even at the ON time, as described above, in the region overlapping the pixel electrode PE and common electrode CE, the alignment state of liquid crystal molecules LM hardly changes from the initial alignment state, no backlight passes and this region becomes a dark part (black display). In the meantime, in the regions overlapping the storage capacitance line C1 extending in the first direction X immediately below the sub-pixel electrode PB, the gate line (not shown) and the source line, since these lines are formed of opaque wiring materials, no backlight passes regardless or the ON time or OFF time, and these regions become dark parts.

At the ON time, the direction of an electric field, which extends from the intersection E12 between the first edge E1 and second edge E2 toward the main common electrode CAL, becomes close to the 45°-225° azimuth direction or the 135°-315° azimuth direction in the X-Y plane. Thus, in the region which does not overlap the storage capacitance line C1 and is close to the intersection E12, the liquid crystal molecule LM is aligned in a direction which becomes close to the 45°-225° azimuth direction or the 135°-315° azimuth direction in which the transmittance is highest. Specifically, in the region near the intersection E12, backlight passes and this region becomes a light part (white display).

On the other hand, the direction of an electric field, which extends from the vicinity of the apex T1 of the projection portion PB1 toward the main common electrode CAL, becomes close to the 0°-180° azimuth direction in the X-Y plane. Thus, the liquid crystal molecule LM in the region is aligned in a direction which becomes close to the 0°-180° azimuth direction. This region becomes a dark part through which no backlight passes. However, since this region is located immediately above the storage capacitance line C1 and becomes a dark part regardless of the alignment state of liquid crystal molecules LM, and there is no substantial loss in transmittance.

According to the structure of the present embodiment, the occurrence of a dark part in the vicinity of the intersection E12, at which the first edge E1 and second edge E2 are made continuous, can be suppressed, and the transmittance can be improved.

FIG. 7 is a view for explaining a relationship between an electric field, which is produced between a pixel electrode PE and a common electrode CE in a liquid crystal display panel LPN according a comparative example, and a transmittance. The example illustrated corresponds to an example in which the width of a sub-pixel electrode PB in the second direction Y is constant regardless of the distance from the main pixel electrode PA, or an example in which the exterior angle θ1 between the first edge E1 of main pixel electrode PA and the second edge E2 of sub-pixel electrode PB, which is continuous with the first edge E1, is a right angle.

At the ON time, an electric field is produced between the main pixel electrode PA and sub-pixel electrode PB, on one hand, and the main common electrode CAL, on the other hand. At such ON time, the direction of an electric field, which extends from the intersection E12 between the first edge E1 and second edge E2 toward the main common electrode CAL, becomes close to the 90°-270° azimuth direction. In particular, at a position near the intersection E12, the electric field is produced along the first edge E1. Thus, in the region which does not overlap the storage capacitance line C1 and is close to the intersection E12, the liquid crystal molecule LM is aligned in a direction which becomes close to the 90°-270° azimuth direction in which the transmittance is lowest. Specifically, in this region, no backlight passes and this region becomes a dark part (black display).

As has been described above, according to the structure of the comparative example, since the dark part occurs near the intersection E12 between the first edge E1 and second edge E2, loss occurs in transmittance. In other words, in the comparative example shown in FIG. 7, compared to the embodiment shown in FIG. 6, the transmittance lowers. In the comparative example shown in FIG. 7, the case has been described that the exterior angle θ1 between the first edge E1 and the second edge E2 is the right angle. As the exterior angle θ1 becomes further smaller than 90°, the direction of the electric field produced between the intersection E12 and the main common electrode CAL becomes closer to the 90°-270° azimuth direction, the dark part becomes larger, and the loss in transmittance increases.

In order to confirm the above-described phenomenon, the inventor prepared a liquid crystal display device corresponding to the present embodiment shown in FIG. 6 and a liquid crystal display device corresponding to the comparative example shown in FIG. 7, and measured the transmittance in the ON state in which the same voltage was applied to the liquid crystal layers LQ. In the liquid crystal display device corresponding to the present embodiment, the exterior angle θ1 between the first edge E1 of the main pixel electrode PA and the second edge E2 of the sub-pixel electrode PB, which is continuous with the first edge E1, was set at 135°. In the liquid crystal display device corresponding to the comparative example, the exterior angle θ1 between the first edge E1 and the second edge E2 was set at 80°. The other conditions are the same. Specifically, the width of the main pixel electrode PA in the first direction X was set at 5 μm, the width of the main common electrode CA in the first direction X was set at 5 μm, a horizontal inter-electrode distance between the main pixel electrode PA and the main common electrode CA in the first direction X was set at 10 μm, the pixel pitch was set at 30 μm, and the cell gap was set at 4 μm.

When the transmittance in the liquid crystal display device corresponding to the comparative example was set at 1, the transmittance of 1.05 was successfully obtained in the liquid crystal display device corresponding to the present embodiment.

According to the present embodiment, the occurrence of a dark part in the vicinity of the intersection between the main pixel electrode PA of the pixel electrode PE, which is included in the array substrate AR, and the sub-pixel electrode PB, which is continuous with the main pixel electrode PA, can be suppressed, and the decrease in transmittance can be suppressed. Thereby, a good display quality can be obtained.

In addition, according to the present embodiment, a high transmittance can be obtained in the inter-electrode gap between the pixel electrode PE and the common electrode CE. Thus, a transmittance per pixel can sufficiently be increased by increasing the inter-electrode distance between the main pixel electrode and the main common electrode. As regards product specifications in which the pixel pitch is different, the peak condition of the transmittance distribution, as shown in FIG. 5, can be used by varying the inter-electrode distance. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, as shown in FIG. 5, if attention is paid to the transmission distribution in the region overlapping the black matrix BM, the transmittance is sufficiently lowered. The reason for this is that the electric field does not leak to the outside of the pixel from the position of the common electrode CE, and an undesired lateral electric field does not occur between pixels which neighbor each other with the black matrix BM interposed, and therefore the liquid crystal molecules in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, when the main common electrode CAL and main common electrode CAR are disposed immediately above the source line S1 and source line S2, respectively, the aperture portion AP can be increased and the transmittance of the pixel PX can be improved, compared to the case in which the main common electrode CAL and main common electrode CAR are disposed on the pixel electrode PE side of the source line S1 and source line S2.

Furthermore, by disposing the main common electrode CAL and main common electrode CAR immediately above the source line S1 and source line S2, respectively, the inter-electrode distance between the pixel electrode PE, on one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 2. An angle Θ formed between the second direction Y and the initial alignment direction D is 0° or more and 45° or less. From the standpoint of alignment control of liquid crystal molecules LM, it is desirable that the initial alignment direction of liquid crystal molecules LM be a direction in a range of 0° or more and 20° or less, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is revered, it is desirable that the above-described formed angle Θ be within the range of 45° or more and 90° or less, preferably the range of 70° or more and 90° or less.

Since a lateral electric field is hardly produced over the pixel electrode PE or common electrode CE even at the ON time (or an electric field enough to drive liquid crystal molecules LM is not produced), the liquid crystal molecules scarcely move from the initial alignment direction, like the case of the OFF time. Thus, even if the pixel electrode PE and common electrode CE are formed of a light-transmissive electrically conductive material such as ITO, little backlight passes through these regions, and these regions hardly contribute to display at the ON time. Thus, the pixel electrode PE and common electrode CE do not necessarily need to be formed of a transparent material, and may be formed of an opaque wiring material such as aluminum, silver or copper.

In the above-described example, the structure, in which the storage capacitance line is disposed immediately below the sub-pixel electrode PB, has been described. However, the gate line may be disposed immediately below the sub-pixel electrode PB. Specifically, the entirety of the projection portion PB1 and projection portion PB2 of the sub-pixel electrode PB may be located on the region overlapping the gate line.

In the present embodiment, the structure of the pixel PX is not limited to the example shown in FIG. 2. Variations of this embodiment will be described below. The pixel electrode PE, main common electrode CAL and main common electrode CAR are illustrated, and depiction of other structural parts is omitted.

FIG. 8 is a plan view which schematically shows another structure example of the pixel PX at a time when the liquid crystal display panel LPN shown in FIG. 1 is viewed from the counter-substrate side.

This structure example differs from the structure example shown in FIG. 2 in that the sub-pixel electrode PB includes second edges E2 having curved shapes, which are continuous with the first edges E1. In this case, an exterior angle θ1 between the first edge E1 and second edge E2 corresponds to an angle θ1 formed between the first edge E1 and a tangent of the second edge E2. This formed angle θ1 is an obtuse angle. An angle θ2 formed between a base E23 and the tangent of the second edge E2 is an acute angle. Each of the projection portion PB1 and projection portion PB2 includes a pair of oblique lines E21 and E22, which are inclined to the first direction X, and the base E23 which is located on the same straight line as the first edge E1. Both the linear oblique line E21 and oblique line E22 are continuous with the second edges E2. The projection portion PB1 includes an apex T1 which is an intersection between the oblique line E21 and oblique line E22. Similarly, the projection portion PB2 includes an apex T2 which is an intersection between the oblique line E21 and oblique line E22. In some cases, each of the apex T1 and apex T2 may be rounded.

In the sub-pixel electrode PB with this shape, too, the same relationship in width, as described with reference to FIG. 3, is established. Therefore, in this structure example, too, the same advantageous effects as in the above-described example can be obtained.

FIG. 9 is a plan view which schematically shows another structure example of the pixel PX at a time when the liquid crystal display panel LPN shown in FIG. 1 is viewed from the counter-substrate side.

This structure example differs from the structure example shown in FIG. 2 in that each of the projection portion PB1 and projection portion PB2 of the sub-pixel electrode PB has a trapezoidal shape. Specifically, each of the projection portion PB1 and projection portion PB2 includes a pair of oblique lines E21 and E22, which are inclined to the first direction X, a lower base E23 which is located on the same straight line as the first edge E1, and an upper base E24 which is shorter than the lower base E23. The oblique line E21 and oblique line E22 correspond to a pair of linear second edges E2 which are continuous with the first edge E1. The length of the oblique line E21 is equal to the length of the oblique line E22. The oblique line E21 is not parallel to the oblique line E22. The upper base E24, which is continuous with the oblique line E21 and oblique line E22, is parallel to the second direction Y. The upper base E24 of the projection portion PB1 is located at a position closest to the source line S1 or main common electrode CAL. The upper base E24 of the projection portion PB2 is located at a position closest to the source line S2 or main common electrode CAR.

In this case, the exterior angle θ1 between the first edge E1 and the linear second edge E2 is an obtuse angle. The exterior angles θ1 at the four locations illustrated are substantially equal. Accordingly, the sum of the exterior angles θ1 at the four locations is greater than 360°. In the meantime, an angle θ2 formed between the base E23 and the tangent of the second edge E2 is an acute angle.

If attention is paid to the width of the sub-pixel electrode PB in the first direction X, a width W2 in the first direction X between the oblique line E21 of projection portion PB1 and the oblique line E21 of projection portion PB2 is greater than a width W1 of the main pixel electrode PA. A width W3 in the first direction X between the upper base E24 of the projection portion PB1 and the upper base E24 of the projection portion PB2 is greater than the width W2 and is a maximum width. A width W4 in the first direction X between the oblique line E22 of projection portion PB1 and the oblique line E22 of projection portion PB2 is greater than the width W1 of the main pixel electrode PA and is smaller than the width W3. Specifically, the sub-pixel electrode PB has the width W3, which is the maximum width in the first direction X, at a position crossing the upper base E24 of the projection portion.

If attention is paid to the width of the sub-pixel electrode PB in the second direction Y, the lower base E23 with a width W11 is longer than the upper base E24 with a width 12 in each of the projection portion PB1 and projection portion PB2 of the sub-pixel electrode PB. In this structure example, too, the same advantageous effects as in the above-described structure examples can be obtained.

FIG. 10 is a plan view which schematically shows another structure example of the pixel PX at a time when the liquid crystal display panel LPN shown in FIG. 1 is viewed from the counter-substrate side.

This structure example differs from the structure example shown in FIG. 9 in that the sub-pixel electrode PB includes second edges E2 having curved shapes, which are continuous with the first edges E1. In this case, an exterior angle θ1 between the first edge E1 and second edge E2 corresponds to an angle θ1 formed between the first edge E1 and a tangent of the second edge E2. This formed angle θ1 is an obtuse angle. Each of the projection portion PB1 and projection portion PB2 includes a pair of oblique lines E21 and E22, which are inclined to the first direction X, a lower base E23 which is located on the same straight line as the first edge E1, and an upper base E24 which is shorter than the lower base E23. The linear oblique line E21 and oblique line E22 are continuous with the second edges E2. In some cases, an intersection between the oblique line E21 and the upper bottom E24 and an intersection between the oblique line E22 and the upper bottom E24 may be rounded.

In the sub-pixel electrode PB with this shape, too, the same relationship in width, as described with reference to FIG. 9, is established. Therefore, in this structure example, too, the same advantageous effects as in the above-described examples can be obtained.

Figure 11:
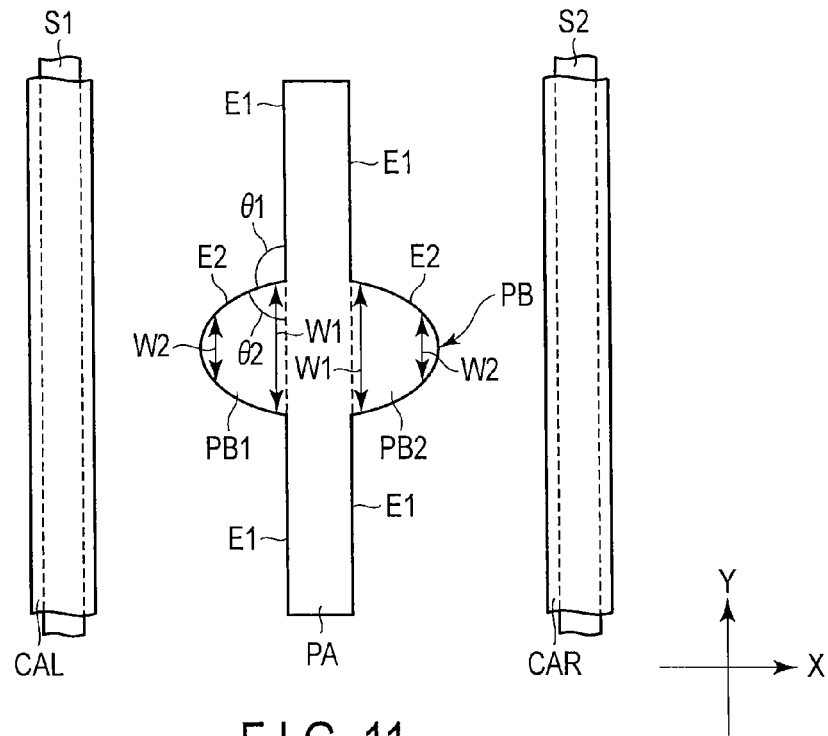
FIG. 11 is a plan view which schematically shows another structure example of the pixel at a time when the liquid crystal display panel shown in FIG. 1 is viewed from the counter-substrate side.

FIG. 11 is a plan view which schematically shows another structure example of the pixel PX at a time when the liquid crystal display panel LPN shown in FIG. 1 is viewed from the counter-substrate side.

This structure example differs from the structure example shown in FIG. 2 in that each of the projection portion PB1 and projection portion PB2 of the sub-pixel electrode PB has a semicircular shape or a semielliptic shape. In this case, an exterior angle θ1 between the first edge E1 of the main pixel electrode PA and the second edge E2 of the sub-pixel electrode PB, which is continuous with the first edge E1, is an obtuse angle. The second edge E2 corresponds to an arc of each of the projection portion PB1 and projection portion PB2.

In the sub-pixel electrode PB with this shape, too, the same relationship in width, as described with reference to FIG. 3, is established. Therefore, in this structure example, too, the same advantageous effects as in the above-described examples can be obtained.

Figure 12:
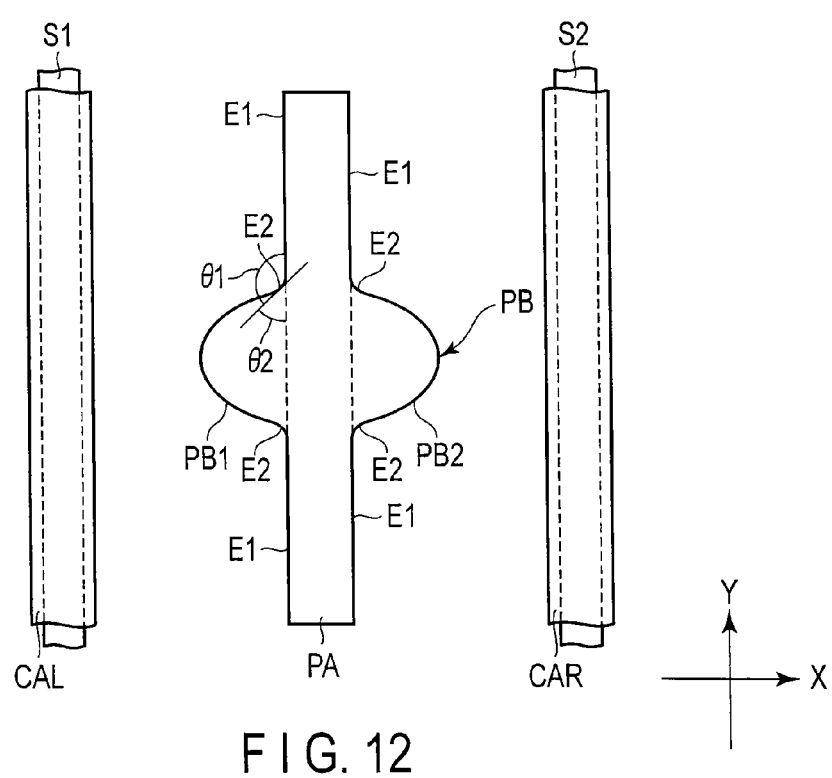
FIG. 12 is a plan view which schematically shows another structure example of the pixel at a time when the liquid crystal display panel shown in FIG. 1 is viewed from the counter-substrate side.

FIG. 12 is a plan view which schematically shows another structure example of the pixel PX at a time when the liquid crystal display panel LPN shown in FIG. 1 is viewed from the counter-substrate side.

This structure example differs from the structure example shown in FIG. 11 in that the sub-pixel electrode PB includes second edges E2 having curved shapes, which are continuous with the first edges E1. In this case, an exterior angle θ1 between the first edge E1 and second edge E2 corresponds to an angle θ1 formed between the first edge E1 and a tangent of the second edge E2. This formed angle θ1 is an obtuse angle.

In the sub-pixel electrode PB with this shape, too, the same relationship in width, as described with reference to FIG. 3, is established. Therefore, in this structure example, too, the same advantageous effects as in the above-described example can be obtained.

In the structure examples of FIG. 2, and FIG. 8 to FIG. 12, the combinations between the linear first edge E1 and the linear or curved second edge E2 have been described. In some cases, however, in the process of the pixel electrode formation, such as etching, the first edge E1 and second edge E2 may be formed in a gently curved shape. In addition, intersections between lines which define the sub-pixel electrode PB, such as the intersection between the first edge E1 and second edge E2, may be rounded. In the case where both the first edge E1 and second edge E2 are curved lines, an angle on the outside of the pixel electrode PE, among the angles formed between the tangent of the first edge E1 and the tangent of the second edge E2, is an obtuse angle, and an angle on the inside of the pixel electrode PE is an acute angle. When the first edge E1 and second edge E2 are disposed in this manner, it is possible to suppress the occurrence of a dark part near an intersection between the main pixel electrode PA of the pixel electrode PE included in the array substrate AR and the sub-pixel electrode PB which is continuous with the main pixel electrode PA, and to suppress a decrease in transmittance.

Figure 13:
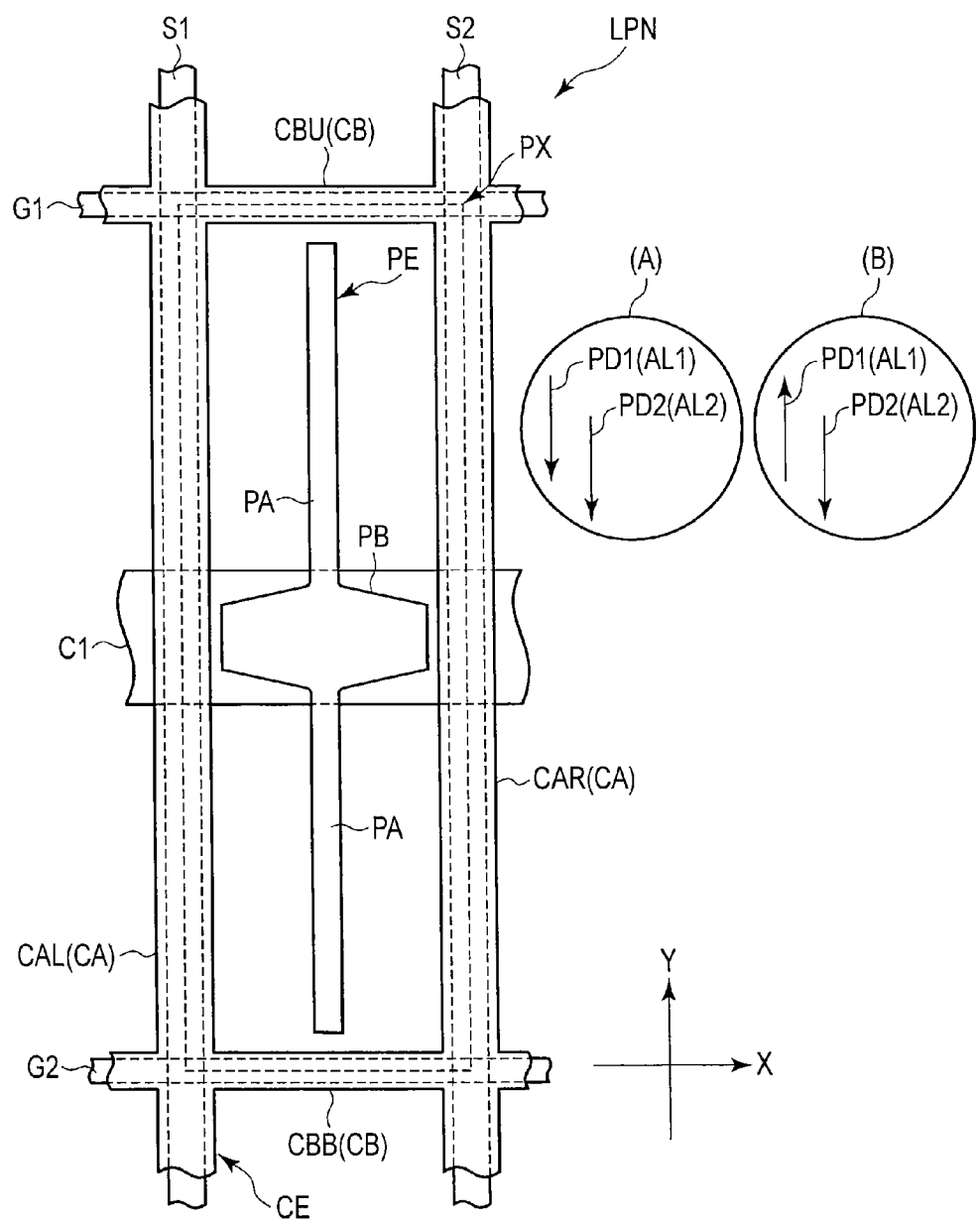
FIG. 13 is a plan view which schematically shows a structure example of the pixel at a time when the liquid crystal display panel shown in FIG. 1 is viewed from the counter-substrate side.

FIG. 13 is a plan view which schematically shows a structure example of the pixel at a time when the liquid crystal display panel shown in FIG. 1 is viewed from the counter-substrate side.

This structure example differs from the structure example shown in FIG. 2 in that the counter-substrate CT includes a sub-common electrode CB which constitutes the common electrode CE, in addition to the main common electrode CA. The sub-common electrode CB is formed integral or continuous with the main common electrode CA, and extends in the first direction X. The sub-common electrode CB is opposed to each of the gate lines G. In the example illustrated, two sub-common electrodes CB are arranged in parallel with a distance in the second direction Y. The sub-common electrodes CB include a sub-common electrode CBU which is disposed at an upper side end portion of the pixel PX, and a sub-common electrode CBB which is disposed at a lower side end portion of the pixel PX. The sub-common electrode CBU is opposed to the gate line G1 and is disposed to extend over a boundary between the pixel PX and a pixel neighboring on the upper side. In addition, the sub-common electrode CBB is opposed to the gate line G2 and is disposed to extend over a boundary between the pixel PX and a pixel neighboring on the lower side. The sub-common electrode CBU and the sub-common electrode CBB are continuous with the main common electrodes CA and constitute a grid-shaped common electrode CE on the counter-substrate CT. In addition, the sub-common electrode CBU and the sub-common electrode CBB are, like the main common electrodes CA, covered with the second alignment film AL2. In this structure example, too, the same advantageous effects as in the above-described examples can be obtained.

Figure 14:
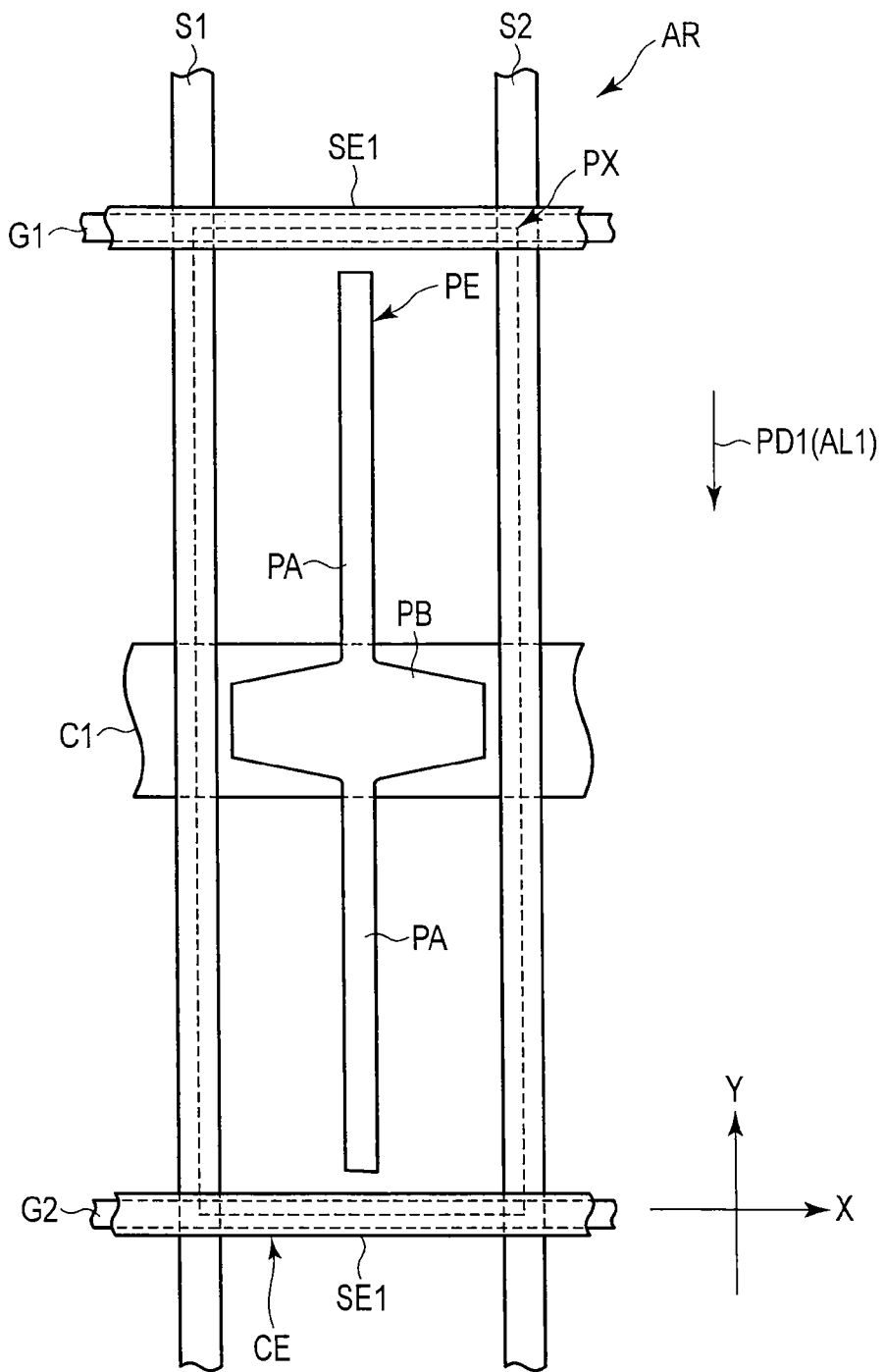
FIG. 14 is a plan view which schematically shows another structure example at a time when an array substrate is viewed from the counter-substrate side.

FIG. 14 is a plan view which schematically shows another structure example at a time when the array substrate AR is viewed from the counter-substrate side.

This structure example differs from the structure example shown in FIG. 2 in that the array substrate AR includes a first shield electrode SE1. The first shield electrode SE1 is electrically connected to the main common electrodes CA and is set at the same potential as the main common electrodes CA. The first shield electrode SE1 extends in the first direction X, and is opposed to each of the gate lines G. In the example illustrated, two first shield electrodes SE1 are arranged in parallel with a distance in the second direction Y. The first shield electrodes SE1 are formed in the same layer as the pixel electrode PE, and can be formed of the same material as the pixel electrode PE. Specifically, when the pixel electrode PE is formed on the second interlayer insulation film 12 in the example shown in FIG. 4, the first shield electrodes SE1 are formed on the second interlayer insulation film 12 and are covered with the first alignment film AL1. The first shield electrodes SE1 are spaced apart from the pixel electrode PE.

In this structure example, the same advantageous effects as in the above-described examples can be obtained. Furthermore, with the provision of the first shield electrodes SE1, an undesired electric field from the gate lines G can be shielded. Therefore, the degradation in display quality can further be suppressed.

Figure 15:
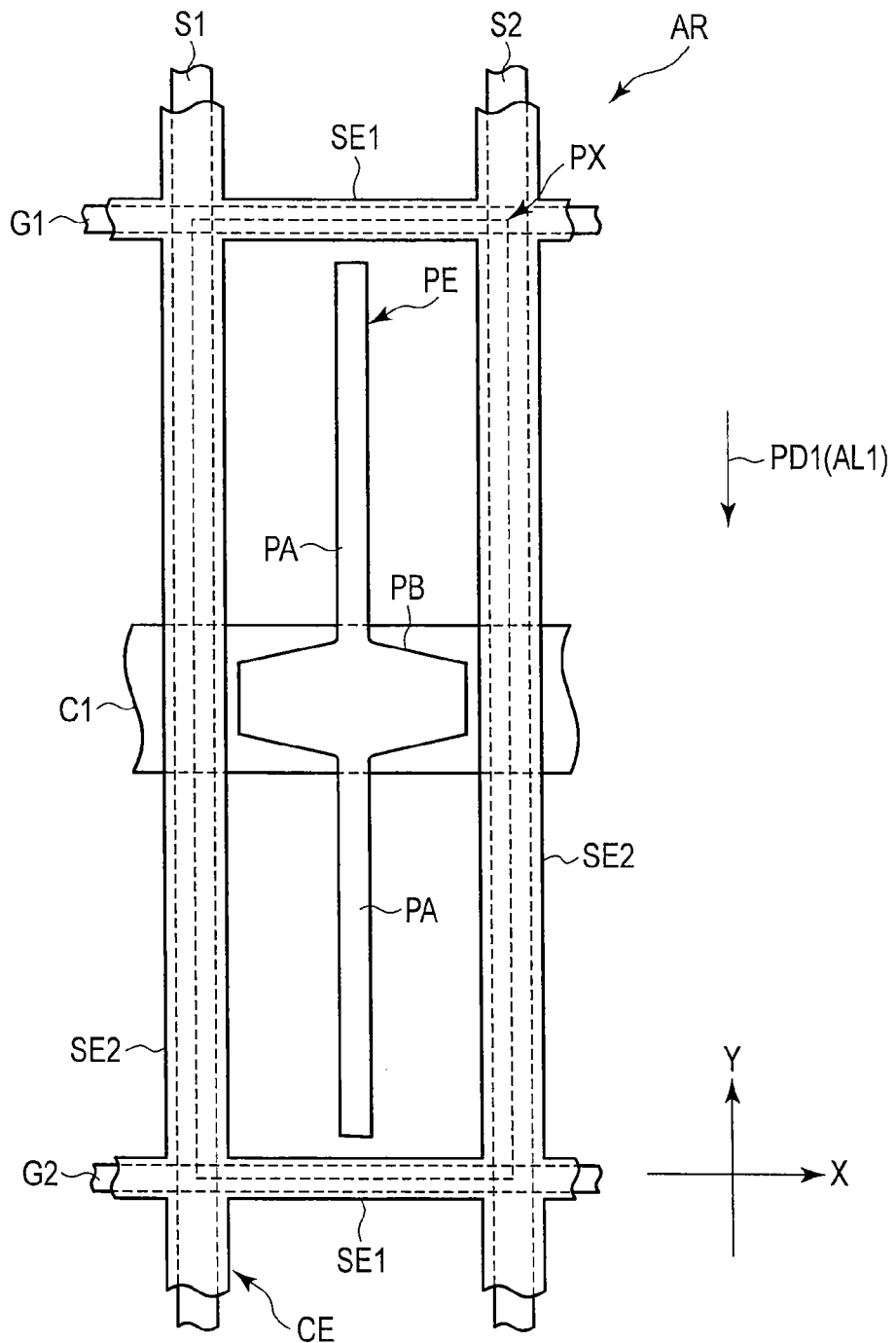
FIG. 15 is a plan view which schematically shows another structure example at a time when the array substrate is viewed from the counter-substrate side.

FIG. 15 is a plan view which schematically shows another structure example at a time when the array substrate AR is viewed from the counter-substrate side.

This structure example differs from the structure example shown in FIG. 14 in that the array substrate AR includes a second shield electrode SE1 in addition to the first shield electrode SE1. The second shield electrode SE2 is continuous with the first shield electrode SE1, and is set at the same potential as the main common electrodes CA. In addition, the second shield electrode SE2 extends in the second direction Y, and is opposed to each of the source lines S. In the example illustrated, two second shield electrodes SE2 are arranged in parallel with a distance in the first direction X. The second shield electrodes SE2 are formed in the same layer as the pixel electrode PE, and can be formed of the same material as the pixel electrode PE. Specifically, the second shield electrodes SE2 are formed on the second interlayer insulation film 12 and are covered with the first alignment film AL1. The second shield electrodes SE2 are spaced apart from the pixel electrode PE. Specifically, the sub-pixel electrode PB is disposed near the second shield electrodes SE2, but is spaced apart from the second shield electrodes SE2.

In this structure example, the same advantageous effects as in the above-described examples can be obtained. Furthermore, with the provision of the second shield electrodes SE2, an undesired electric field from the source lines S can be shielded. Therefore, the degradation in display quality can further be suppressed.

The sub-pixel electrodes PB shown in FIG. 13 to FIG. 15 have the same shape as in the structure example shown in FIG. 10. However, the sub-pixel electrodes PB shown in FIG. 13 to FIG. 15 may have the same shape as in the structure examples shown in FIG. 2, FIG. 8, FIG. 9, FIG. 11 and FIG. 12.

FIG. 16 is a plan view which schematically shows another structure example at a time when the array substrate AR is viewed from the counter-substrate side.

This structure example differs from the structure example shown in FIG. 2 in that the pixel electrode PE is formed in a T shape. The main pixel electrode PA is formed in a straight line shape along the second direction Y from one end portion on the gate line G1 side to the other end portion on the gate line G2 side. A sub-pixel electrode PB is opposed to the storage capacitance line C1, and crosses one end portion in the second direction Y of the main pixel electrode PA. The sub-pixel electrode PB includes a projection portion PB1 which protrudes from the intersection with the main pixel electrode PA toward the source line S1, and a projection portion PB2 which protrudes from the intersection with the main pixel electrode PA toward the source line S2. The projection portion PB1 and projection portion PB2 have an identical shape. The sub-pixel electrode PB includes second edges E2 which are continuous with the first edges E1.

In the pixel electrode PE with this shape, an exterior angle $\theta 1$ is formed at two locations between the main pixel electrode PA and the sub-pixel electrode PB. The exterior angle $\theta 1$ corresponds to an angle formed between the first edge E1 and the second edge E2. Each of the exterior angles $\theta 1$ formed at the two locations is an obtuse angle which is greater than 90°, and the exterior angles $\theta 1$ at the two locations are substantially equal.

A width W2 of the sub-pixel electrode PB in the first direction X is greater than the width W1 of the main pixel electrode PA. The sub-pixel electrode PB has a width W3, which is a maximum width in the first direction X, at a central part in the second direction Y. The projection portion PB1 of the sub-pixel electrode PB has a width W11 at a position on the main pixel electrode PA side, and a width W12, which is less than the width W11, at a position on the source line S1 side or a position on the main common electrode CAL side. Similarly, the projection portion PB2 of the sub-pixel electrode PB has a width W11 at a position on the main pixel electrode PA side, and a width W12, which is less than the width W11, at a position on the source line S2 side or a position on the main common electrode CAR side.

In this structure example, the number of domains, which are formed in one pixel, is less than in the structure examples shown in FIG. 2, etc., but the occurrence of a dark part can be suppressed and the same advantageous effects as in the above-described structure examples can be obtained.

The array substrates AR of the structure examples shown in FIG. 14 to FIG. 16 may be combined with the counter-substrate CT including the main common electrodes CA shown in FIG. 2, or may be combined with the counter-substrate CT including the main common electrodes CA and sub-common electrodes CB shown in FIG. 13.

As has been described above, according to the present embodiments, a liquid crystal display device which has a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first wiring line and a second wiring line which are separated from each other by a distance in a first direction and extend in a second direction crossing the first direction, a strip-shaped main pixel electrode which is disposed between the first wiring line and the second wiring line and includes a first edge linearly extending in the second direction, and a sub-pixel electrode which includes a second edge extending in a direction different from the direction of extension of the first edge, the second edge being continuous with the first edge;
a second substrate including main common electrodes which are opposed to the first wiring line and the second wiring line and extend substantially parallel to the main pixel electrode; and
a liquid crystal layer including liquid crystal molecules held between the first substrate and the second substrate,
wherein an exterior angle between the first edge and the second edge is an obtuse angle, the exterior angle is an angle formed between the first edge and a tangent of the second edge having a curved shape, and the second substrate includes a sub-common electrode which is continuous with the main common electrodes, extends in the first direction, and is covered with the second alignment film, wherein the first substrate further includes a gate line extending in the first direction, and a first shield electrode which is set at a same potential as the main common electrodes, extends in the first direction, and is opposed to the gate line.

2. The liquid crystal display device of claim 1, wherein a sum of four exterior angles between the main pixel electrode and the sub-pixel electrode is greater than 360°.

3. The liquid crystal display device of claim 1, wherein the first substrate further includes a second shield electrode which is set at the same potential as the main common electrodes, extends in the second direction, is opposed to the first wiring line.

4. The liquid crystal display device of claim 1, wherein the first substrate further includes a gate line and a storage capacitance line which extend in the first direction, and a switching element electrically connected to the gate line and the first wiring line, and the sub-pixel electrode is opposed to the storage capacitance line and is electrically connected to the switching element.

5. A liquid crystal display device comprising:

a first substrate including a strip-shaped main pixel electrode having a first width in a first direction and linearly extending in a second direction crossing the first direction, the main pixel electrode including a first edge extending in the second direction, the first substrate further including a sub-pixel electrode crossing the main pixel electrode and protruding from the first edge in the first direction, and a first alignment film covering the main pixel electrode and the sub-pixel electrode;

a second substrate including main common electrodes extending substantially parallel to the main pixel electrode on both sides of the main pixel electrode, and a second alignment film covering the main common electrodes; and a liquid crystal layer including liquid crystal molecules held between the first substrate and the second substrate, wherein the sub-pixel electrode has a second width, which is greater than the first width, in the first direction, has a third width, which is a maximum width in the first direction, at a central portion of the sub-pixel electrode, has a fourth width in the second direction at a position with a first distance from the first edge in the first direction, and has a fifth width, which is less than the fourth width, at a position at a second distance, which is greater than the first distance, from the first edge in the first direction, the sub-pixel electrode includes projection portions protruding on both sides of the main pixel electrode, each of the projection portions has a triangular shape including a pair of oblique lines which are inclined to the first direction, and a base which is located on the same straight line as the first edge, and the second substrate includes a sub-common electrode which is continuous with the main common electrodes, extends in the first direction, and is covered with the second alignment film, wherein the first substrate further includes a gate line extending in the first direction, and a first shield electrode which is set at a same potential as the main common electrodes, extends in the first direction, is opposed to the gate line, and is covered with the first alignment film.

6. The liquid crystal display device of claim 5, wherein the sub-pixel electrode crosses an intermediate portion in the second direction of the main pixel electrode.

7. The liquid crystal display device of claim 6, wherein a sum of four exterior angles between the main pixel electrode and the sub-pixel electrode is greater than 360°.

8. The liquid crystal display device of claim 5, wherein the projection portions, which are located on both sides of the main pixel electrode, have an identical shape.

9. The liquid crystal display device of claim 5, wherein the sub-pixel electrode includes a second edge which is continuous with the first edge, and an exterior angle between the first edge and the second edge is an obtuse angle.

10. The liquid crystal display device of claim 5, wherein the first substrate further includes a source line extending in the second direction, and a second shield electrode which is set at the same potential as the main common electrodes, extends in the second direction, is opposed to the source line, and is covered with the first alignment film.

11. The liquid crystal display device of claim 5, wherein the first substrate further includes a gate line and a storage capacitance line which extend in the first direction, a source line extending in the second direction, and a switching element electrically connected to the gate line and the source line, and the sub-pixel electrode is opposed to the storage capacitance line and is electrically connected to the switching element.

12. A liquid crystal display device comprising:

a first substrate including a strip-shaped main pixel electrode having a first width in a first direction and linearly extending in a second direction crossing the first direction, the main pixel electrode including a first edge extending in the second direction, the first substrate further including a sub-pixel electrode crossing the main pixel electrode and protruding from the first edge in the first direction, and a first alignment film covering the main pixel electrode and the sub-pixel electrode;

a second substrate including main common electrodes extending substantially parallel to the main pixel electrode on both sides of the main pixel electrode, and a second alignment film covering the main common electrodes; and a liquid crystal layer including liquid crystal molecules held between the first substrate and the second substrate, wherein the sub-pixel electrode has a second width, which is greater than the first width, in the first direction, has a third width, which is a maximum width in the first direction, at a central portion of the sub-pixel electrode, has a fourth width in the second direction at a position at a first distance from the first edge in the first direction, and has a fifth width, which is less than the fourth width, at a position at a second distance, which is greater than the first distance, from the first edge in the first direction, the sub-pixel electrode includes projection portions protruding on both sides of the main pixel electrode, each of the projection portions has a semicircular shape or a semielliptic shape, and the second substrate includes a sub-common electrode which is continuous with the main common electrodes, extends in the first direction, and is covered with the second alignment film, wherein the first substrate further includes a gate line extending in the first direction, and a first shield electrode which is set at a same potential as the main common electrodes, extends in the first direction, is opposed to the gate line and is covered with the first alignment film.

13. The liquid crystal display device of claim 12, wherein the sub-pixel electrode crosses an intermediate portion in the second direction of the main pixel electrode.

14. The liquid crystal display device of claim 13, wherein a sum of four exterior angles between the main pixel electrode and the sub-pixel electrode is greater than 360°.

15. The liquid crystal display device of claim 12, wherein the projection portions, which are located on both sides of the main pixel electrode, have an identical shape.

16. The liquid crystal display device of claim 12, wherein the sub-pixel electrode includes a second edge which is continuous with the first edge, and an exterior angle between the first edge and the second edge is an obtuse angle.

17. The liquid crystal display device of claim 12, wherein the first substrate further includes a source line extending in the second direction, and a second shield electrode which is set at the same potential as the main common electrode, extends in the second direction, is opposed to the source line, and is covered with the first alignment film.

18. The liquid crystal display device of claim 12, wherein the first substrate further includes a gate line and a storage capacitance line which extend in the first direction, a source line extending in the second direction, and a switching element electrically connected to the gate line and the source line, and the sub-pixel electrode is opposed to the storage capacitance line and is electrically connected to the switching element.

* * * * *